United States Patent
Ahmed et al.

(10) Patent No.: US 12,462,011 B2
(45) Date of Patent: Nov. 4, 2025

(54) SYSTEMS AND METHODS FOR SPDM DEVICE AND BASEBOARD MANAGEMENT CONTROLLER (BMC) PAIRING

(71) Applicant: Dell Products, L.P., Round Rock, TX (US)

(72) Inventors: A Anis Ahmed, Bangalore (IN); Mini Thottunkal Thankappan, Bangalore (IN); Vineeth Radhakrishnan, Palakkad (IN); Dharma Bhushan Ramaiah, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 308 days.

(21) Appl. No.: 18/180,963

(22) Filed: Mar. 9, 2023

(65) Prior Publication Data

US 2024/0303317 A1    Sep. 12, 2024

(51) Int. Cl.
*G06F 21/44* (2013.01)
(52) U.S. Cl.
CPC .................... *G06F 21/44* (2013.01)
(58) Field of Classification Search
None
See application file for complete search history.

(56) References Cited

U.S. PATENT DOCUMENTS

| | | | | |
|---|---|---|---|---|
| 11,012,858 B1 * | 5/2021 | Kozlowski | ............... | H04L 63/18 |
| 11,552,803 B1 * | 1/2023 | Simkhada | ............... | G06F 21/73 |
| 2019/0236313 A1 * | 8/2019 | Bush | .................... | H04L 63/0823 |
| 2020/0382519 A1 * | 12/2020 | Barton | .................. | H04L 63/107 |
| 2021/0367794 A1 * | 11/2021 | Datko | ................. | H04L 63/0823 |
| 2021/0367974 A1 * | 11/2021 | Ponnuru | ............. | H04L 63/0823 |
| 2023/0025979 A1 * | 1/2023 | Bolen | ..................... | G06F 21/44 |
| 2023/0093190 A1 * | 3/2023 | Ramachandran | ....... | H04L 45/28 |
| | | | | 709/223 |
| 2023/0214534 A1 * | 7/2023 | Mensch | .................. | G06F 21/73 |
| | | | | 726/34 |
| 2023/0224292 A1 * | 7/2023 | Nadiminti | ........... | H04L 63/0823 |
| | | | | 726/6 |
| 2024/0419776 A1 * | 12/2024 | Wu | ....................... | G06F 9/4401 |
| 2025/0004792 A1 * | 1/2025 | Kelly | .................. | G06F 9/44505 |

OTHER PUBLICATIONS

DMTF, DSP2058, Security Protocol and Data Model (SPDM) Architecture White Paper, 35 pages, published May 13, 2020. (Year: 2020).*

* cited by examiner

*Primary Examiner* — Joshua Joo
(74) *Attorney, Agent, or Firm* — Fogarty LLP

(57) ABSTRACT

According to embodiments of the present disclosure, systems and methods for SPDM device and BMC pairing are provided. According to one embodiment, an Information Handling System (IHS) includes a Security Protocol and Data Model (SPDM)-enabled device conforming to a SPDM specification, and a Baseboard Management Controller (BMC) configured with computer executable instructions to provision a SPDM identity certificate of the BMC in the SPDM-enabled device, verify that the BMC has been paired with the SPDM-enabled device using the SPDM identity certificate, and when the authentication of the SPDM-enabled device fails, inhibit operation of the SPDM-enabled device in the IHS.

17 Claims, 4 Drawing Sheets

SYSTEMS AND METHODS FOR SPDM DEVICE AND BASEBOARD MANAGEMENT CONTROLLER (BMC) PAIRING

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of trust provided thereby.

SUMMARY

According to embodiments of the present disclosure, systems and methods for SPDM device and BMC pairing are provided. According to one embodiment, an Information Handling System (IHS) includes a Security Protocol and Data Model (SPDM)-enabled device conforming to a SPDM specification, and a Baseboard Management Controller (BMC) configured with computer executable instructions to provision a SPDM identity certificate of the BMC in the SPDM-enabled device, verify that the BMC has been paired with the SPDM-enabled device using the SPDM identity certificate, and when the authentication of the SPDM-enabled device fails, inhibit operation of the SPDM-enabled device in the IHS.

According to another embodiment, a SPDM-enabled device pairing method includes the steps of provisioning a SPDM identity certificate of a Baseboard Management Controller (BMC) in a SPDM-enabled device, verifying that the BMC has been paired with the SPDM-enabled device using the SPDM identity certificate, and when the authentication of the SPDM-enabled device fails, inhibiting operation of the SPDM-enabled device in an Information Handling System (IHS).

According to yet another embodiment, a computer program product includes a computer readable storage medium having program instructions stored thereon that, upon execution by an Information Handling System (IHS), cause the IHS to provision a Security Protocol and Data Model (SPDM) identity certificate of a Baseboard Management Controller (BMC) in a SPDM-enabled device conforming to a SPDM specification, verify that the BMC has been paired with the SPDM-enabled device using the SPDM identity certificate, and when the authentication of the SPDM-enabled device fails, inhibit operation of the SPDM-enabled device in the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
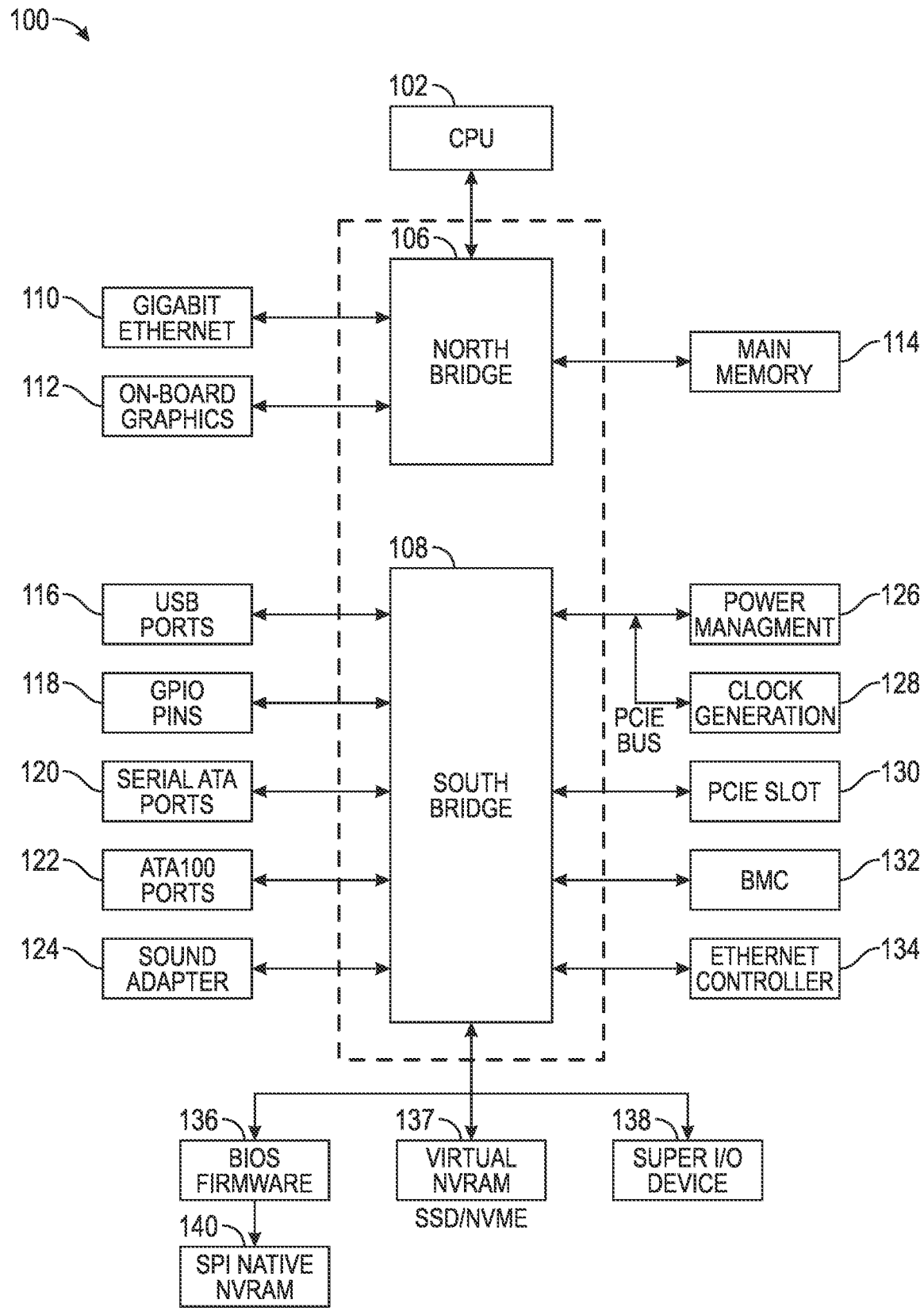
FIG. 1 shows an example of an Information Handling System (IHS) that may be configured to implement a system and method for device pairing using Security Protocol and Data Model (SPDM) according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with Baseboard Management Controllers (BMCs) that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

Usually, users of IHSs, such as servers, which are used for critical purposes do not encourage any change in their configuration and assembly once it is tested and accepted for use. For example, organizations (e.g., defense organizations, medical care facilities, etc.) that use and store highly sensitive information prefer that any server components remain static (e.g., stay in the same configuration) in order to mitigate the risk of any data leaks when transferred to other systems. Currently, data centers or organizations that use and store sensitive information do not have any technique to pair devices in a server with their respective server to prevent them from being in inadvertently or illicitly used in other servers. For example, no techniques have heretofore existed for blocking (e.g., stopping) the device from being moved to another server. Additionally, no techniques have heretofore existed to add a new device, or replace or repurpose (e.g., move a device from one server to another) a device in a systematic manner in which the addition or re-purposing of devices is needed or desired. According to embodiments of the present disclosure, systems and methods for SPDM device and IHS pairing are provided in which a SPDM identity certificate of the BMC is provisioned in a SPDM-enabled device, such as before the SPDM-enabled device is initially assembled in the IHS or before the SPDM-enabled device is moved (e.g., repurposed) in another IHS, so that when the SPDM-enabled device is re-booted, the SPDM-enabled device may be authenticated, using an SPDM protocol, using the certificate stored in the SPDM-enabled device, and inhibit the operation of the SPDM-enabled device when the authentication of the SPDM-enabled device fails.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

Figure 2:
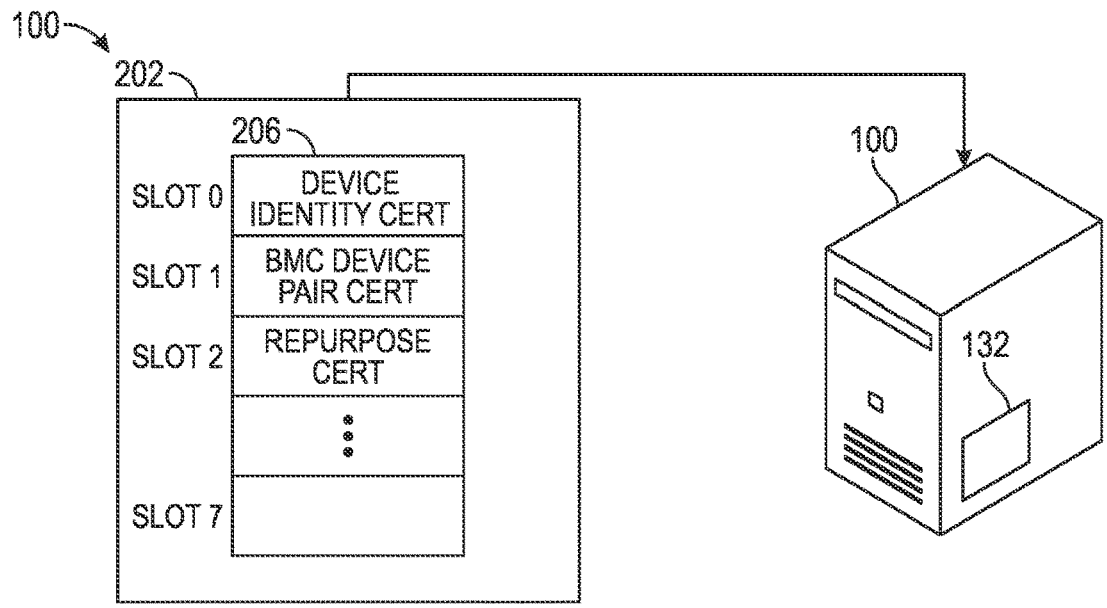
FIG. 2 illustrates an example SPDM device and BMC pairing system that may be used to securely pair a SPDM-enabled device with a Baseboard Management Controller (BMC) according to one embodiment of the present disclosure.

FIG. 2 illustrates an example SPDM device and BMC pairing system 200 that may be used to securely pair a SPDM-enabled device with a BMC according to one embodiment of the present disclosure. The device pairing system 200 includes a BMC 132 and a SPDM-enabled device 202 that is to be configured in an IHS 100, such as when the SPDM-enabled device 202 is configured in the IHS 100 during assembly of the IHS 100 in a vendor facility where the IHS 100 is manufactured. The SPDM-enabled device 202 stores a SPDM slot structure 206 comprising slots 0-7 that conform to the SPDM specification. Slot 0 is specified by SPDM to store a device identity certificate. According to embodiments of the present disclosure, slot 1 may be used to store a BMC device pairing certificate for pairing with the BMC 132 so that the SPDM-enabled device 202 may only be used in conjunction with that particular BMC 132. Also as will be described in detail herein below, slot 2 may be used to store a re-purposing certificate for moving (e.g., re-purposing) the SPDM-enabled device 202 from one IHS 100 to another. While in the example device pairing system 200 shows and describes slot 1 and slot 2 of the slot structure that are used to store a BMC device pairing certificate and a rep certificate, respectively, it should be understood that the BMC device pairing certificate and rep certificate may be stored in any of slots 1-7 without departing from the spirit and scope of the present disclosure.

According to embodiments of the present disclosure, the IHS 100 may support SPDM in which the BMC 132 manages the operation of one or more SPDM-enabled devices 202 configured in the IHS 100. The SPDM-enabled device 202 may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 3:
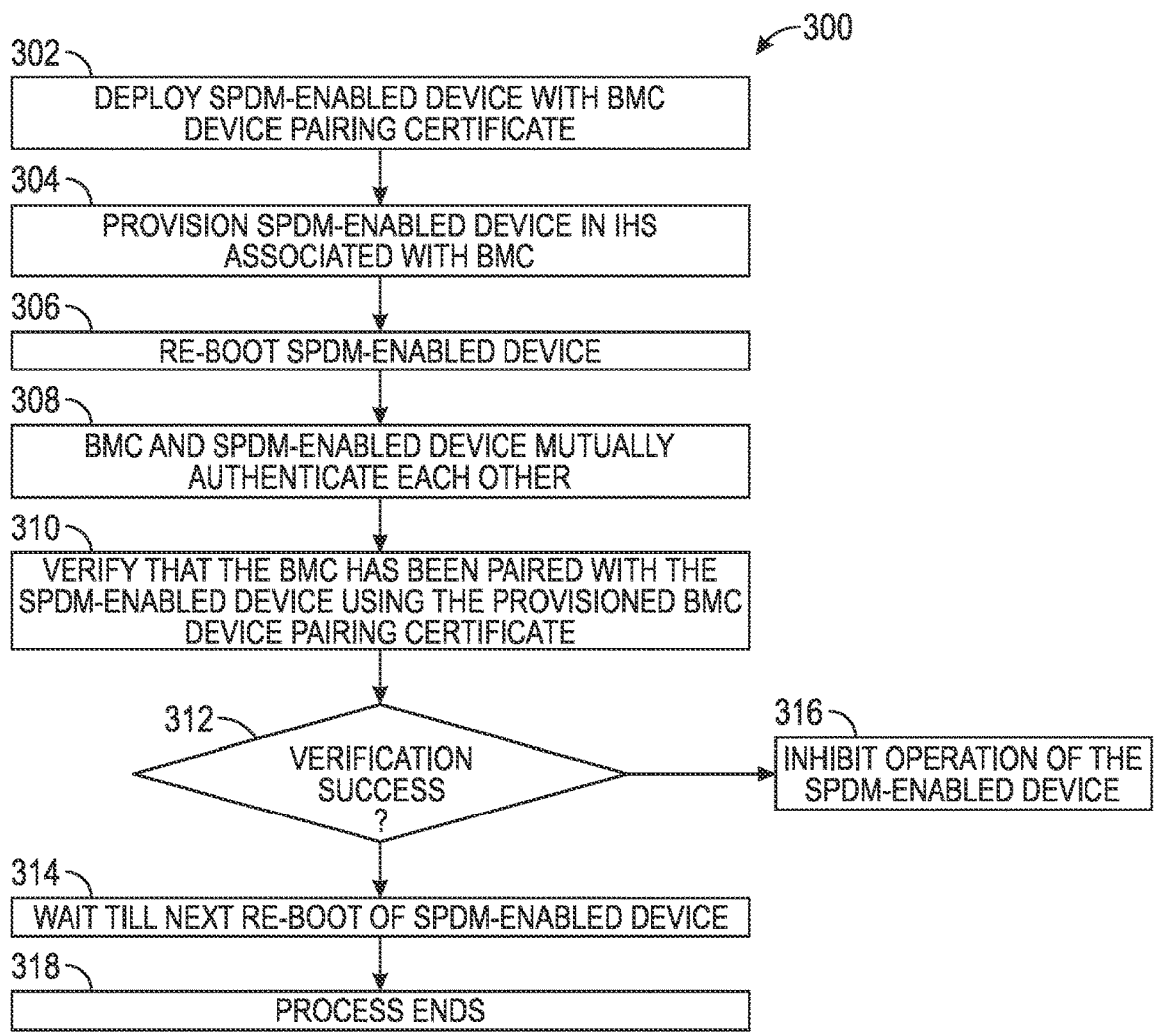
FIG. 3 illustrates an example device pairing method that may be used to pair a SPDM-enabled device with a BMC configured in an IHS according to one embodiment of the present disclosure.

FIG. 3 illustrates an example device pairing method 300 that may be used to pair a SPDM-enabled device 202 with a BMC 132 configured in an IHS 100 according to one embodiment of the present disclosure. Additionally or alternatively, the device pairing method 300 may be performed by the device pairing system 200 as described above with reference to FIG. 2. The device pairing method 300 may be performed, for example, with each SPDM-enabled device 202 that is configured in an IHS 100, such as when they are initially deployed in the IHS 100 during an assembly process managed by a vendor of the IHS 100.

Initially at step 302, a SPDM-enabled device 202 is deployed (e.g., inserted) in an IHS 100. Thereafter at step 304, a SPDM-enabled device 202 is provisioned with a BMC device identity certificate. For example, a factory IHS 100 may communicate with the BMC 132 to obtain its identity certificate, and in turn, communicate with the SPDM-enabled device 202 to store the obtained identity in a SPDM slot other than slot 0 (e.g., slots 1-7). In one embodiment, the BMC device identity certificate may be include the public key of the device identity certificate stored in slot 0 of the BMC 132. In other embodiments, the SPDM-enabled device 202 may be provisioned with the BMC device identity certificate prior to being deployed in the IHS 100.

At step 306, the SPDM-enabled device 202 is re-booted. The re-boot operation may be any type that re-loads the firmware of the SPDM-enabled device 202 and commences its operation, such as during a system re-boot operation, a warm-boot operation, or an On Chip Reset (OCR) operation. The SPDM-enabled device 202 and the BMC 132 then mutually authenticate each other using standard SPDM techniques at step 308. At step 310, the method 300 verifies that the BMC 132 has been paired with the SPDM-enabled device 202 using the provisioned BMC device pairing certificate stored in the SPDM-enabled device 202. In one embodiment, either BMC OR SPDM-enabled device may compare the BMC device pairing certificate stored in the SPDM-enabled device 202 with the identity certificate of the BMC 132 to verify that the BMC 132 has been paired with the SPDM-enabled device 202. In another embodiment, the SPDM-enabled device 202 may issue a challenge request that causes the BMC 132 to respond with a challenge message requesting that the SPDM-enabled device 202 respond with a message encrypted using the BMC device pairing certificate. Upon receiving a response from the SPDM-enabled device 202, the BMC 132 may then decrypt the message to determine whether the SPDM-enabled device 202 is indeed paired with that BMC 132.

At step 312, the method 300 determines whether the verification is successful. If so, the method 300 waits till the SPDM-enabled device 202 is again re-booted in which the SPDM-enabled device 202 is used in a normal manner at step 314. If, however, the verification was not successful, processing continues at step 316 in which the method 300 inhibits the operation of the SPDM-enabled device 202. The operation of the SPDM-enabled device 202 may be inhibited in any suitable manner. For example, the BMC 132 may inhibit operation of the SPDM-enabled device 202 by disabling any in-band and/or out-of-band communication with the SPDM-enabled device 202. Thereafter at step 318, the process ends.

Thus as described above, pairing of the SPDM-enabled device 202 with its respective BMC 132 may be verified each time the SPDM-enabled device 202 is re-booted. In other embodiments, the pairing of the SPDM-enabled device 202 with its respective BMC 132 may be verified at other suitable times, such as during a device audit procedure where the SPDM-enabled devices 202 in each of the IHSs 100 of a data center are inventoried to ensure their proper placement within the data center.

Figure 4:
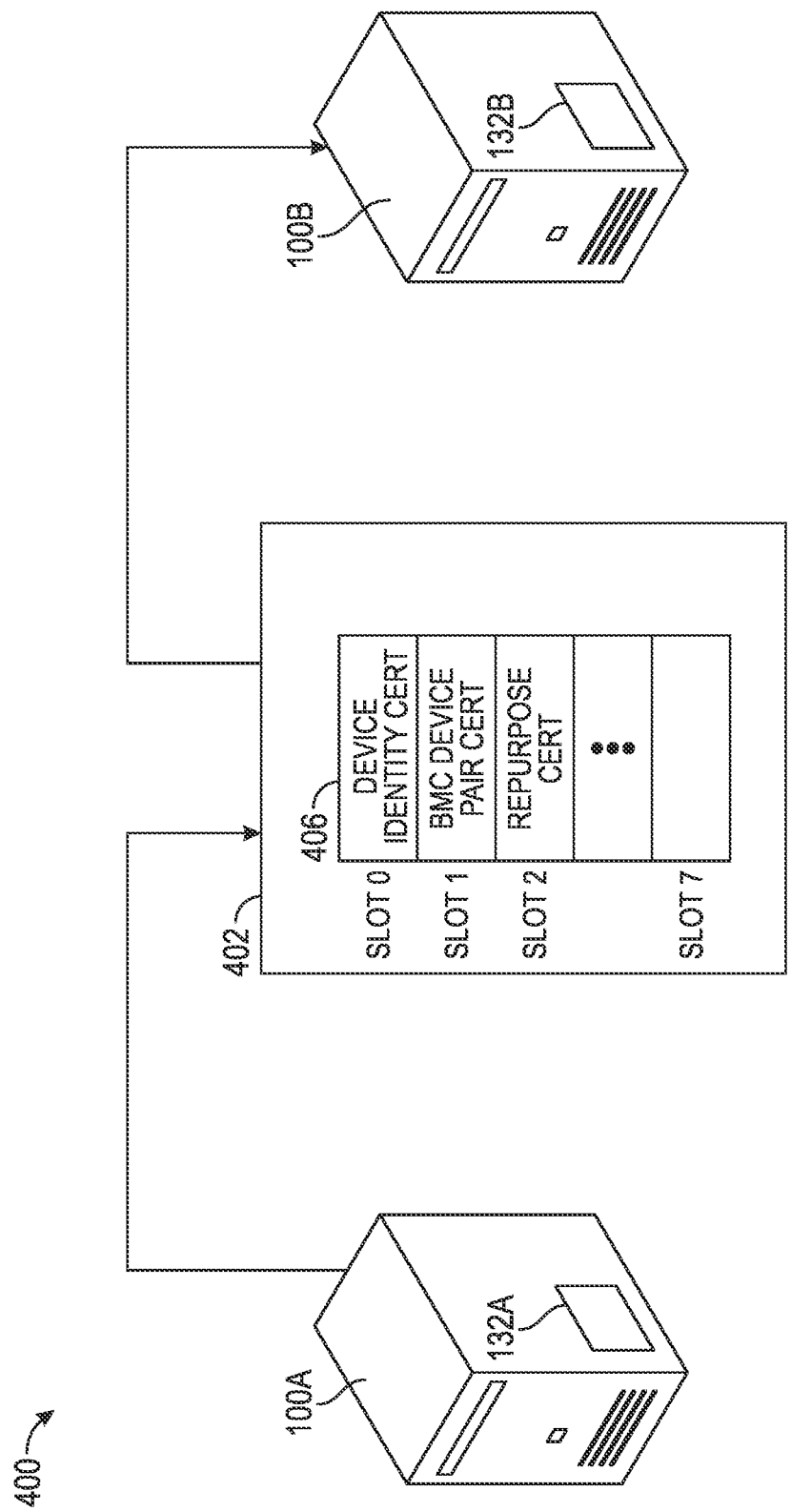
FIG. 4 illustrates another example device pairing system showing how a SPDM-enabled device may be re-purposed from originating IHS to a destination IHS according to one embodiment of the present disclosure.

FIG. 4 illustrates another example device pairing system 400 showing how a SPDM-enabled device 402 may be re-purposed (e.g., moved) from originating IHS 100a to a destination IHS 100b by securely pairing the SPDM-enabled device 402 with a destination BMC 132b configured in the destination IHS 100b according to one embodiment of the present disclosure. The originating IHS 100a is configured with an origination BMC 132a, while the destination IHS 100b is configured with a destination BMC 132b. The SPDM-enabled device 402 and its SPDM slot structure 406 is similar in design and construction to the SPDM-enabled device 202 and SPDM slot structure 206 as described above with reference to FIG. 2. Additionally, the SPDM-enabled device 402 may be any suitable type that conforms to the SPDM specification.

Figure 5:
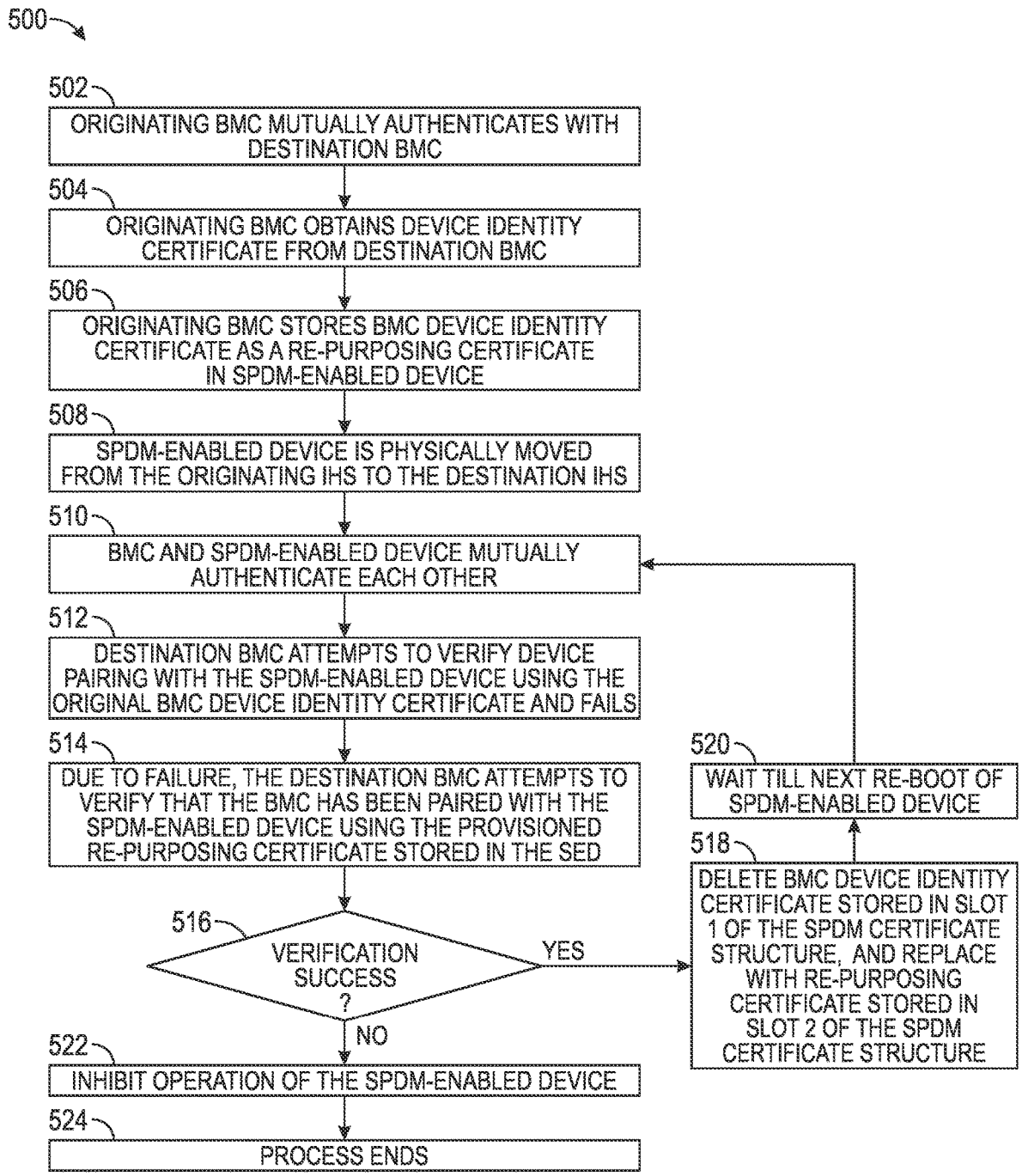
FIG. 5 illustrates an example device pairing method that may be performed to re-purpose a SPDM-enabled device according to one embodiment of the present disclosure.

FIG. 5 illustrates an example device pairing method 500 that may be performed to re-purpose a SPDM-enabled device 402 according to one embodiment of the present disclosure. Additionally or alternatively, the device pairing method 500 may be performed by the device pairing system 400 as described above with reference to FIG. 4. The device pairing method 500 may be performed, for example, when a SPDM-enabled device 402 is removed from an originating IHS 100a and deployed in a destination IHS 100b.

At step 502, the originating BMC 132a mutually authenticates with the destination BMC 132b, for example, using conventional SPDM authentication techniques. Once authenticated, the originating BMC 132a obtains a device identity certificate from the destination BMC 132b at step 504. In one embodiment, the device identity certificate is the BMC device identity certificate stored in slot 0 of the destination BMC 132b. At step 506, the originating BMC 132a stores the BMC device identity certificate as a re-purposing certificate in a slot other than slot 0 of the SPDM slot structure 406 (e.g., slots 1-7). Thereafter at step 508, the SPDM-enabled device 402 is physically moved from the originating IHS 100a to the destination IHS 100b.

At step 510, the destination BMC 132b and SPDM-enabled device 402 mutually authenticate one another, such as by using conventional SPDM authentication techniques. At step 512, the destination BMC 132b attempts to verify device pairing with the SPDM-enabled device 402 using the original BMC device identity certificate and fails. For example, the device pairing fails because the destination BMC 132b possesses a different device identity certificate than that stored in slot 1 of the SPDM certificate structure 406 of the SPDM-enabled device 402. Due to the failure of the device pairing, the destination BMC 132b attempts to verify that the destination BMC 132b has been paired with the SPDM-enabled device 402 using the provisioned re-purposing certificate stored in (e.g., slot 2 of the SPDM certificate structure) of the SPDM-enabled device 402 at step 514. In one embodiment, either the destination BMC 132b or the SPDM-enabled device may perform the act of comparing the BMC device pairing certificate with the identity certificate of the destination BMC 132b. For a particular example, the SPDM-enabled device 402 may issue a challenge request that causes the destination BMC 132b to respond with a challenge message requesting that the SPDM-enabled device 402 respond with a message encrypted using the BMC device pairing certificate. Upon receiving a response from the SPDM-enabled device 402, the destination BMC 132b may then decrypt the message to determine whether the SPDM-enabled device 420 is indeed paired with the destination BMC 132b.

At step 516, the method 500 determines whether the verification was successful. If so, processing continues at step 518; otherwise processing continues at step 522. At step 518, the BMC device identity certificate stored in slot 1 of the SPDM certificate structure 406 is deleted and replaced with the re-purposing certificate stored in slot 2 of the SPDM certificate structure 406, and at step 520, the method 500 waits for the next re-boot of the SPDM-enabled device 402 in which processing continues at step 510 to verify that the SPDM-enabled device 402 is paired with the destination BMC 132b the next time that the SPDM-enabled device 402 is re-booted.

At step 522, the method 500 inhibits operation of the SPDM-enabled device 402 with the destination IHS 100b. The method 500 may inhibit operation of the SPDM-enabled device 402 in any suitable manner, such as by ceasing communication (e.g., disabling any in-band and/or out-of-band communication) with the SPDM-enabled device 402. Thereafter at step 524, the process ends.

Although FIGS. 3 and 5 describe example methods 300 and 500 that may be performed to securely pair a SPDM-enabled device 202 and 402 with a BMC 132, the features of the methods 300 and 500 may be embodied in other specific forms without deviating from the spirit and scope of the present disclosure. For example, either of the methods 300 and 500 may perform additional, fewer, or different operations than those described in the present examples. For another example, either of the methods 300 and 500 may be performed in a sequence of steps different from that described above. As yet another example, certain steps of either of the methods 300 and 500 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a Security Protocol and Data Model (SPDM)-enabled device conforming to a SPDM specification; and
a Baseboard Management Controller (BMC) comprising at least one memory coupled to at least one processor, the at least one memory having program instructions stored thereon that, upon execution by the at least one processor, cause the BMC to:
provision a SPDM identity certificate of the BMC in the SPDM-enabled device;
authenticate the SPDM-enabled device, and verify that the BMC has been paired with the authenticated SPDM-enabled device, based at least in part on the SPDM identity certificate;
when the authentication of the SPDM-enabled device fails, inhibit operation of the SPDM-enabled device in the IHS; and
when the SPDM-enabled device is re-booted, provision the SPDM identity certificate, authenticate the SPDM-enabled device, and verify that the BMC has been paired with the authenticated SPDM-enabled device, based at least in part on the SPDM identity certificate.

2. The IHS of claim 1, wherein the program instructions, upon execution, further cause the BMC to:
mutually authenticate with an other BMC configured in another IHS;
obtain a second SPDM device identity certificate of the other BMC;
provision the second SPDM device identity certificate of the other BMC in the SPDM-enabled device;
when the SPDM-enabled device is moved to the other IHS, verify that the second SPDM device identity certificate provisioned in the SPDM-enabled device matches the SPDM device identity certificate of the other BMC; and when the verification that the second SPDM device identity certificate matches fails, inhibit operation of the SPDM-enabled device in the other IHS.

3. The IHS of claim 2, wherein the program instructions, upon execution, further cause BMC to, when the verification that the second SPDM device identity certificate matches succeeds, replace the SPDM device identity certificate with the second SPDM device identity certificate in a SPDM certificate structure in the SPDM-enabled device.

4. The IHS of claim 1, wherein the SPDM identity certificate is provisioned in the SPDM-enabled device during assembly of the IHS, and wherein the program instructions, upon execution, further cause authentication of the SPDM-enabled device when the IHS is booted, based at least in part on the SPDM identity certificate provisioned during IHS assembly.

5. The IHS of claim 1, wherein the program instructions, upon execution, further cause BMC to provision the SPDM identity certificate in one of slots 1-7 in a SPDM certificate structure of the SPDM-enabled device.

6. The IHS of claim 1, wherein the program instructions, upon execution, further cause BMC to, when the authentication of the SPDM-enabled device succeeds, allow operation of the SPDM-enabled device in the IHS.

7. The IHS of claim 1, wherein the program instructions, upon execution, further cause BMC to inhibit operation of the SPDM-enabled device based at least in part on cause an in-band or out-of-band communication with the SPDM-enabled device to be disabled.

8. A method comprising:
provisioning a Security Protocol and Data Model (SPDM) identity certificate of a Baseboard Management Controller (BMC) in a SPDM-enabled device conforming to a SPDM specification, during assembly of an Information Handling System (IHS) for configuration with the BMC;
authenticating the SPDM-enabled device, and verifying that the BMC has been paired with the authenticated SPDM-enabled device using the SPDM identity certificate; and
when the authentication of the SPDM-enabled device fails, inhibiting operation of the SPDM-enabled device in the IHS.

9. The method of claim 8, further comprising:
mutually authenticating with an other BMC configured in another IHS;
obtaining a second SPDM device identity certificate of the other BMC;
provisioning the second SPDM device identity certificate of the other BMC in the SPDM-enabled device;
when the SPDM-enabled device is moved to the other IHS, verifying that the second SPDM device identity certificate provisioned in the SPDM-enabled device matches the SPDM device identity certificate of the other BMC; and
when the verification that the second SPDM device identity certificate matches fails, inhibiting operation of the SPDM-enabled device in the other IHS.

10. The method of claim 9, further comprising, when the verification that the second SPDM device identity certificate matches succeeds, replacing the SPDM device identity certificate with the second SPDM device identity certificate in a SPDM certificate structure in the SPDM-enabled device.

11. The method of claim 8, further comprising performing the acts of provisioning the SPDM identity certificate and verifying that the BMC has been paired each time the SPDM-enabled device is re-booted.

12. The method of claim 8, further comprising provisioning the SPDM identity certificate in one of slots 1-7 in a SPDM certificate structure of the SPDM-enabled device.

13. The method of claim 8, further comprising, when the authentication of the SPDM-enabled device succeeds, allowing operation of the SPDM-enabled device in the IHS.

14. The method of claim 8, further comprising inhibiting operation of the SPDM-enabled device by disabling an in-band or out-of-band communication with the SPDM-enabled device.

15. A computer program product comprising a non-transitory computer readable storage medium having program instructions stored thereon that, upon execution by an Information Handling System (IHS), cause the IHS to:
provision a Security Protocol and Data Model (SPDM) identity certificate of a Baseboard Management Controller (BMC) in a SPDM-enabled device conforming to a SPDM specification;
authenticate the SPDM-enabled device, and verify that the BMC has been paired with the authenticated SPDM-enabled device based at least in part on the SPDM identity certificate;
when the authentication of the SPDM-enabled device fails, inhibit operation of the SPDM-enabled device in the IHS; and
when the SPDM-enabled device is re-booted, provision the SPDM identity certificate, authenticate the SPDM-enabled device, and verify that the BMC has been paired with the authenticated SPDM-enabled device, based at least in part on the SPDM identity certificate.

16. The computer program product of claim 15, wherein the program instructions, upon execution, further cause the BMC to:
mutually authenticate with an other BMC configured in an other IHS;
obtain a second SPDM device identity certificate of the other BMC;
provision the second SPDM device identity certificate of the other BMC in the SPDM-enabled device;
when the SPDM-enabled device is moved to the other IHS, verify that the second SPDM device identity certificate provisioned in the SPDM-enabled device matches the SPDM device identity certificate of the other BMC;
when the verification that the second SPDM device identity certificate matches fails, inhibit operation of the SPDM-enabled device in the other IHS; and
when the verification succeeds, replace the SPDM device identity certificate with the second SPDM device identity certificate in a SPDM certificate structure in the SPDM-enabled device.

17. The computer program product of claim 15, wherein the program instructions, upon execution, further cause the BMC to provision the SPDM identity certificate in one of slots 1-7 in a SPDM certificate structure of the SPDM-enabled device.

* * * * *